United States Patent
Shefet et al.

(10) Patent No.: US 6,866,573 B2
(45) Date of Patent: Mar. 15, 2005

(54) AUTOMATED SUPPORT MEMBER POSITIONING AND REMOVING SYSTEMS AND RELATED DEVICES AND METHODS

(75) Inventors: Sarid M. Shefet, Cary, NC (US); John Michael Phillips, State Road, NC (US); Frank Michael Horvath, Jr., Harmony, NC (US); Richard Rodeheaver Hawkins, Raleigh, NC (US); Lawrence Alan Chandler, Raleigh, NC (US)

(73) Assignee: ConAgra Foods, Inc., Edina, MN (US)

( * ) Notice: Subject to any disclaimer, the term of this patent is extended or adjusted under 35 U.S.C. 154(b) by 0 days.

(21) Appl. No.: 10/170,869

(22) Filed: Jun. 13, 2002

(65) Prior Publication Data

US 2003/0190382 A1 Oct. 9, 2003

Related U.S. Application Data

(60) Provisional application No. 60/370,874, filed on Apr. 8, 2002.

(51) Int. Cl.$^7$ ............................................. A22C 11/00
(52) U.S. Cl. ....................................................... 452/32
(58) Field of Search ............................... 452/30–35, 37, 452/46, 51

(56) References Cited

U.S. PATENT DOCUMENTS

| | | | |
|---|---|---|---|
| 2,697,850 A | 12/1954 | Cross | 452/47 |
| 3,022,745 A | 2/1962 | Roberts | 104/99 |
| 3,533,495 A | 10/1970 | Wallace | |
| 3,964,129 A | 6/1976 | Townsend | |
| 4,060,875 A | 12/1977 | Gosling et al. | |
| 4,079,666 A | 3/1978 | Plemons et al. | 99/355 |
| 4,112,546 A | 9/1978 | Muller | |
| 4,129,923 A | 12/1978 | Hoegger | 452/46 |
| 4,218,003 A | 8/1980 | Plewa et al. | 452/31 |
| 4,233,709 A | * 11/1980 | Smith et al. | 452/49 |

(List continued on next page.)

FOREIGN PATENT DOCUMENTS

| | | |
|---|---|---|
| DE | 3137276 | 4/1983 |
| EP | 0399582 | 1/1990 |
| FR | 2088622 | 4/1970 |

OTHER PUBLICATIONS

U.S. Appl. No. 10/170,887, filed Jun. 13, 2002, 9281–3.
U.S. Appl. No. 10/170,652, filed Jun. 13, 2002, 9281–5.
U.S. Appl. No. 10/171,864, filed Jun. 13, 2002, 9281–6.
U.S. Appl. No. 10/170,823, filed Jun. 13, 2002, 9281–9.
U.S. Appl. No. 10/171,862, filed Jun. 13, 2002, 9281–10.
U.S. Appl. No. 10/171,865, filed Jun. 13, 2002, 9281–11.
U.S. Appl. No. 10/172,331, filed Jun. 13, 2002, 9281–13.

(List continued on next page.)

Primary Examiner—Thomas Price
(74) Attorney, Agent, or Firm—Myers Bigel Sibley & Sajovec PA

(57) ABSTRACT

Methods, systems, and associated devices for supplying support members to a product loading station and automatically removing loaded members therefrom include: (a) advancing in serial order and spaced apart relationship, a plurality of elongated support members having opposing first and second ends and an associated length, along a selected travel path; (b) loading each of the elongated support members individually with a respective continuous length of multiple loops or multiple discrete lengths of elongated product at the loading station; and (c) advancing the loaded elongated support members away from the loading station along the selected travel path. The loaders may be configured with winding mechanisms that wind elongated products directly onto elongated support members, such as bars, sticks, or rods, by causing the arm to follow a repetitive motion pattern above and below the stick or rod to discharge the elongated product in a winding motion onto the bar, stick, or rod so that they loop or drape directly onto the rod, stick, bar or other desired food support is also described.

25 Claims, 15 Drawing Sheets

U.S. PATENT DOCUMENTS

| | | | | |
|---|---|---|---|---|
| 4,547,931 | A | | 10/1985 | Staudenrausch et al. ...... 17/1 F |
| 4,565,282 | A | | 1/1986 | Olsson et al. ............... 198/778 |
| 4,582,047 | A | | 4/1986 | Williams ..................... 126/369 |
| 4,612,684 | A | | 9/1986 | Kollross ....................... 452/35 |
| 4,644,607 | A | | 2/1987 | Sziede .......................... 17/45 |
| 4,682,385 | A | | 7/1987 | Kasai et al. |
| 4,761,654 | A | | 8/1988 | Schnell et al. ................ 17/1 R |
| 4,766,645 | A | | 8/1988 | Lamartino et al. ............. 17/49 |
| 4,880,105 | A | * | 11/1989 | Kasai et al. ............. 198/465.4 |
| 4,997,365 | A | | 3/1991 | Lanham ...................... 432/121 |
| 5,049,108 | A | | 9/1991 | Staudenrausch ............. 452/48 |
| 5,078,120 | A | | 1/1992 | Hwang ..................... 126/21 A |
| 5,098,332 | A | | 3/1992 | Handel ........................ 452/46 |
| 5,277,301 | A | | 1/1994 | Fenty ....................... 198/77 B |
| 5,354,229 | A | | 10/1994 | Markwardt et al. ........... 452/51 |
| 5,354,230 | A | | 10/1994 | McFarlane et al. ........... 452/51 |
| 5,480,346 | A | | 1/1996 | Kasai et al. .................... 452/47 |
| RE35,259 | E | | 6/1996 | Williams ..................... 126/369 |
| 5,788,563 | A | | 8/1998 | Nakamura et al. ............ 452/47 |
| 5,830,050 | A | | 11/1998 | Nakamura et al. ............ 452/31 |
| 5,942,265 | A | | 8/1999 | Roberds et al. ............... 426/59 |
| 6,066,035 | A | | 5/2000 | Hergott et al. ................ 452/31 |
| 6,071,186 | A | | 6/2000 | Shibata et al. |
| 6,213,368 | B1 | | 4/2001 | Vermeer et al. ............ 226/104 |
| 6,277,018 | B1 | | 8/2001 | Cody et al. .................... 452/51 |
| 6,468,143 | B1 | | 10/2002 | White et al. .................. 452/32 |
| 6,523,462 | B1 | * | 2/2003 | Johnson et al. ........... 99/443 C |
| 6,572,465 | B2 | * | 6/2003 | Kimura ........................ 452/51 |
| 6,592,452 | B1 | * | 7/2003 | Myers .......................... 452/51 |
| 2003/0171084 | A1 | | 9/2003 | Shefet et al. .................. 452/35 |
| 2003/0171086 | A1 | | 9/2003 | Shefet et al. ............... 452/177 |
| 2003/0171088 | A1 | | 9/2003 | Shefet et al. ............... 452/187 |

OTHER PUBLICATIONS

Article, "Continuous Process Systems", Alkar, http://www.alkar.com, date unavailable; believed to be dated before Mar. 1, 2002, pp. 1–3.

Article, "Batch Ovens", Alkar, http://www.alkar.com date unavailable; believed to be dated before Mar. 1, 2002, pp. 1–3.

Brochure, "Fessmann Turbomat 7000: Industrial Smoking and Cooking", Fessman Group, date unavailable; believed to be dated before Mar. 3, 2002, pp. 1–8.

Brochure, "Fessmann Smoking Cooking Cooling", Fessman Group, date unavailable; believed to be dated before Mar. 1, 2002, pp. 1–8.

Brochure, "Fessmann Transfer 4000: Continuous Smoking, Cooking and Cooling", Fessman Group, date unavailable; believed to be dated before Mar. 1, 2002, pp. 1–9.

Pictures of the inside of a conventional prior art oven from Alkar.

PCT International Search Report, International Application No. PCT/US03/04727 filed Feb. 20, 2003; mailed Dec. 5, 2003.

* cited by examiner

AUTOMATED SUPPORT MEMBER POSITIONING AND REMOVING SYSTEMS AND RELATED DEVICES AND METHODS

RELATED APPLICATIONS

This application claims priority from U.S. Provisional Patent Application Ser. No. 60/370,874 filed Apr. 8, 2002, the contents of which are hereby incorporated by reference as if recited in full herein.

FIELD OF THE INVENTION

The present invention relates to movement or transfer of product within processing facilities and is particularly suitable for automatically positioning rods or product support members proximate automated loaders of lengths of products, such as extruded or stuffed food products, in food preparation and production systems.

BACKGROUND OF THE INVENTION

Conventionally, extruded or stuffed food products such as pasta, dough, and meats such as hot dogs, links, or sausages, can be processed so that the desired food material is extruded or mixed and prepared, then propelled through a "stuffer machine" that includes a stuffing nozzle, extrusion machine, or co-extrusion machine. In operation, in certain food items, as the food moves through the stuffing nozzle or extrusion head, a natural or synthetic casing is disposed about and/or deposited or wrapped around the external surface of the food material to form a continuous length of encased elongated food product. To form certain products (such as hotdogs and sausages), the casing can be twisted, tied, nipped, and/or crimped at certain intervals, forming a chain-like string or strand of encased food product. Extruders and co-extruders are available from various commercial manufacturers including, but not limited to, Townsend Engineering Co., located in Des Moines, Iowa. Stuffers are available from various commercial manufacturers including, but not limited to, HITEC Food Equipment, Inc., located in Elk Grove Village, Ill., Townsend Engineering Co., located in Des Moines, Iowa, Robert Reiser & Co., Inc., located in Canton, Mass., and Handtmann, Inc., located in Buffalo Grove, Ill. Exemplary stuffer and/or linker apparatus are also described in U.S. Pat. Nos. 5,788,563; 5,480,346; 5,049,108; and 4,766,645. The contents of these patents are hereby incorporated by reference as if recited in fill herein.

After stuffing or extruding, the encased elongated food product is expelled from the stuffer or extruder via a material discharging exit port. FIG. 1A illustrates a conventional stuffer 10 and stuffer material discharge port 10*p*. The stuffer discharge port 10*p* is positioned proximate a "linker" or looping and transferring device 15 (FIG. 1B) that rotates an endless chain of hooks 15*h* about the discharge port 10*p*. Generally described, the material discharge port 10*p* is configured so that, during operation, the product is expelled and directed so that the traveling hooks, which serially travel to be adjacent the discharge port 10*p*, catch a portion of the length of the product, with the result that the product forms loops on the hooks at certain intervals. More specifically, certain devices are configured so that the hooks 15*h* travel to the discharge port 10*p* and the discharge port 10*p* discharges into a downwardly inclined channel that directs the elongated food downward and, as the hooks turn to face the discharged food, the hooks sequentially individually reach out to grasp the product at certain intervals. Other devices propel the encased product onto hooks that rotate thereabout (typically under) to catch the product at certain intervals to transfer the encased material onto the transfer device. The hooks 15*h* then suspend the product in a looped configuration (hanging in a vertical orientation) as shown in FIG. 1B, with each hook 15*h* supporting a single loop of product.

FIG. 1C illustrates a slightly different prior art stuffer 10 and associated linker 15 with hooks that are oriented to rotate in a different plane from that shown in FIG. 1A (i.e., a vertical plane rather than a horizontal plane). In addition, in this prior art stuffer/linker, the discharge port 10*p* terminates into a short expanse of tubing that forms a rotating discharge nozzle 10*r*. The rotating nozzle 10*r*, again, propels the extruded encased product onto the hooks 15*h*.

After the product is suspended on the hooks 15*h*, a rod or stick is typically manually inserted through the suspended looped product above the hooks and below the upper looped portion of the food, and the product is manually lifted up and off the hooks 15*h* and transferred to a trolley, oven, or other food processing station.

In view of the foregoing, there is a need to provide automated processing systems that can improve the production process to facilitate the loading of food receiving members such as sticks and/or reduce the need for manual labor to load sticks.

SUMMARY OF THE INVENTION

Certain embodiments of the present invention provide automated positioning and removal systems of food support members that can automate the loading of empty and/or the removal or subsequent downstream transfer of filled or loaded food support members. The food support members can be portable and adapted to hold, carry, and transfer, away from the extruder/stuffer, the elongated, extruded, and/or stuffed product. The food support members can be used to directly capture and hold the product at the extruder/stuffer discharge port and then to deliver the product to a trolley or desired workstation or equipment. The food support members may be elongated, such as bars, rods or sticks.

In certain embodiments, the positioning and removal systems provided by the present invention can be configured with a carousel portion that can substantially continuously provide a series of unloaded (empty) rods to a loading station and then automatically take-away the rods from the loading station when they are loaded with looped product. The positioning and removal systems may be configured as endless systems with a fixed travel path associated with a predetermined travel track that, in operation, continuously serially advances the rods. The positioning and removal systems may be particularly suitable for use with automated winders as described more fully in co-pending U.S. Provisional Application Ser. No. 60/362,375 filed Mar. 7, 2002, the contents of which are hereby incorporated by reference as if recited in full herein.

The loading station may include a winder with a winding arm that extends a distance away from the discharge port of an upstream stuffer or extrusion apparatus. The arm can be configured to repetitively translate a vertical distance so as to travel above and below (and or side to side about) a suitably aligned rod or transfer member that is automatically located in the loading zone. The arm may be configured to move up and down and/or forward and rearward or across the aligned transfer member. In certain other embodiments, the arm can rotate in a substantially circular, oval, elliptical, or other desired motion. The generated motion may be a closed loop path that has two different directions of travel, such as a motion that includes both x and y axis directional components. The rod or food transfer or support member may be configured to automatically unidirectionally (linearly) translate forward as the arm translates (moved either forward or backward toward or away from the stuffer discharge port) so that the automated winder can wrap discrete lengths or loop distributed multiple loops of the released product starting at one end portion of the transfer member and terminating at the opposing end portion so that substantially the entire length (or a desired length) of the transfer member is covered with a continuous length of looped product.

In other embodiments the winder can load discontinuous lengths of product, shown as a plurality of cut lengths of elongated product that are straddled onto and/or draped over the support member. In either case, the product can be loaded onto the support member such that the strands have substantially the same suspended lengths, or to have varying lengths, along the same or different rods or support members.

The rod or transport member can be one, or more, portable stick members upon which the wrapped continuous length product is suspended in a looped arrangement, each loop can have a substantially uniform length or different lengths.

A first aspect of the invention is a method for supplying support members to a product loading station and automatically removing loaded support members therefrom. The method includes: (a) advancing, in serial order and in spaced-apart relationship, a plurality of elongated support members having opposing first and second ends and an associated length, along a selected travel path to a loading station; (b) loading each of the elongated support members individually with a respective continuous length of elongated product formed into multiple loops or a plurality of discrete lengths of suspended elongated product at the loading station; and (c) advancing the loaded elongated support members away from the loading station along the selected travel path to cause the loaded elongated support members to travel downstream of the loading position.

In certain embodiments, the selected travel path includes a linear portion, and the loading step is carried out while the respective elongated support member being loaded is continuously advancing forward along the linear portion of the selected travel path. The travel path may also include a curvilinear portion.

Other embodiments are directed to apparatus for supplying support members to a product loading station and automatically removing loaded support members therefrom. The apparatus can include: (a) advancing means for advancing, in serial order and in spaced-apart relationship, a plurality of elongated support members having opposing first and second ends and an associated length, along a selected travel path to a loading station; (b) loading means for loading each of the elongated support members individually with a respective continuous length of elongated product formed into multiple loops or a plurality of discrete lengths of elongated product at the loading station; and (c) advancing means for advancing the loaded elongated support members away from the loading station along the selected travel path to cause the loaded elongated support members to travel downstream of the loading position.

Other embodiments are directed to an automated elongated support member supply and removal system. The system includes: (a) a central platform member; (b) a travel track mounted to the platform member that, in operation, is configured to advance continuously about an endless path about the platform member; (c) a plurality of mounting brackets, each individually mounted to said travel track in spaced apart intervals, the mounting brackets being configured to travel along the endless path; and (d) a plurality of elongated support members, each having an end portion configured to releasably attach to a respective mounting bracket.

Still other embodiments are directed to an automated loading system. The system includes: (a) a plurality of elongated support members having a length and sized and configured to hold multiple loops or a plurality of discrete lengths of an elongated product thereon; (b) an automated winder configured to be cooperatively positioned and aligned with the discharge port of an extrusion/stuffer device configured to discharge-elongated product therefrom, the automated winder comprising; and (c) an automated apparatus for continuously presenting and positioning in serial order a respective one of the plurality of elongated support members to the winding arm so that the winding arm is positioned in spaced apart cooperating alignment with the elongated support member and is able to load the support members with a plurality of loops of the elongated product. The automated winder includes: (a) an elongated arm having an associated length that is about equal to or greater than the length of the elongated support member, said elongated arm having opposing first and second end portions, wherein, in position, said first end portion is adapted to receive an elongated product thereon from the extrusion device, wherein said second end portion is configured to release the elongated item therefrom after the item travels greater than a major portion of the length of the arm in a direction that is away from the extrusion/stuffer device; and (b) a winding mechanism attached to said elongated arm, said winding mechanism being configured to cause said elongated arm to travel repetitively in a desired motion so that, in operation, the winding mechanism causes the elongated product to wind serially about one of the support members as it is released from the second end portion of the arm.

In certain embodiments, the automated apparatus continuously translates the elongated support member away from the extrusion/stuffer device during operation so as to distribute multiple loops of or a plurality of discrete lengths of suspended product over a desired length of the support member.

In particular embodiments, the transfer support member is linearly translated forward away from the extrusion or stuffer device during loading so as to receive the wound product so that it is distributed over a desired length of the support member. The wound product may be arranged in substantially uniform looped or draped lengths of product hung or suspended from the transfer support member. The system may be arranged so that over a desired time period, the winder is substantially continuously operated to load a plurality of support members that are serially aligned with the arm for a desired interval of time so as to successively transfer and wind elongated product thereon.

Further, in certain embodiments, the transfer support member(s) is a stick or rod that can mount to conventional trolleys and/or be used to support the elongated product at the next active workstation that may be an oven, a smoker, a curer, or other food preparation/processing station.

These and other objects and aspects of the present invention are explained in detail in the specification set forth below.

DESCRIPTION OF EMBODIMENTS OF THE INVENTION

Figure 1A:
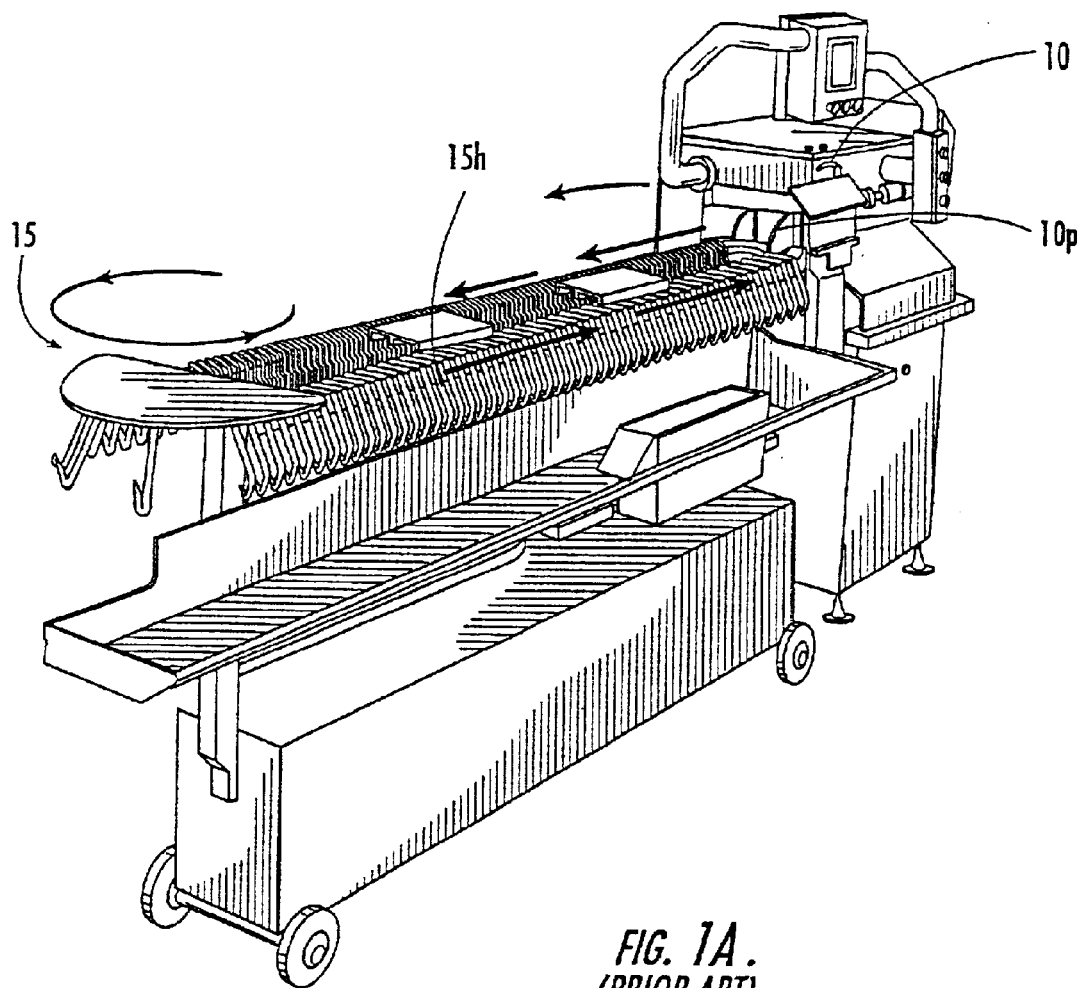
FIG. 1A is a perspective view of a prior art extruded food stuffer and associated linker or transferring and looping device.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations unless specified otherwise. The sequence of operations (or steps) is not limited to the order presented in the claims unless specifically indicated otherwise.

In the description of the present invention that follows, certain terms are employed to refer to the positional relationship of certain structures relative to other structures. As used herein, the term "forward" and derivatives thereof refer to the general or primary direction that food travels as it moves inside a food processor from a processing point or region to the next processing point or region; this term is intended to be synonymous with the term "downstream," which is often used in manufacturing environments to indicate that certain material being acted upon is farther along in the manufacturing process than other material. Conversely, the terms "rearward" and "upstream" and derivatives thereof refer to the directions opposite, respectively, the forward and downstream directions.

The automated apparatus, systems and methods of the present invention may be particularly suitable to provide a substantially continuous supply of empty food support members such as rods for automated loading with elongated food items. When "loaded," the support members or rods can support multiple loops of food as the food is transported downstream onto a trolley, car, or the next desired workstation. The elongated support member 40 (FIG. 2A) can have any suitable configuration with a length sufficient to hold the desired amount of product thereon. Examples of elongated support members include, but are not limited to, bars, rods, or vertically spaced connected or independent pairs of bars or rods. The support member may be a substantially straight elongated rod or bar having a circular cross-section with a non-disrupted or continuous outer perimeter surface or may be otherwise configured as will be discussed further below. However, it will be appreciated by those of skill in the art that the present invention encompasses a number of different configurations that can act as suitable support members and the present invention is not limited to the embodiments described herein. In addition, in operation, a plurality of elongated support members, of the same or different configurations, may be sequentially serially loaded and removed from the automated positioning apparatus. The product may be loaded in substantially even lengths of loops or in uneven lengths of loops, or combinations thereof, over each or particular ones of the support members.

Examples of elongated food items include, but are not limited to, elastic or partially elastic food items such as cheese (e.g., mozzarella strands), dough (for incubation), pasta, meat sticks or strands, licorice or other strands of candy, and meat products. Of course, the processing system can be configured to wind or transfer other items. For example, other elongated products include candles, ropes, cables, wires, hose, tubing, and the like.

In certain embodiments, the present invention is used to transfer and load a length of an elongated extruded product held in a casing onto a support member. The casing can be any suitable casing (edible or inedible, natural or synthetic) such as, but not limited to, collagen, cellulose, plastic, elastomeric or polymeric casing. The elongated product can be an elongated meat product. Exemplary meat products include, but are not limited to, strands of meat (that may comprise pepperoni, poultry, and/or beef or other desired meat), processed meat products such as strand(s) or continuous lengths of meat sticks (including whole or partial meat mixtures), sausages, hotdogs, and the like. The term "continuous" is used interchangeably with "contiguous" to mean that the product is connected or joined (directly or indirectly) over its length.

The elongated product can be configured as a continuous length of product having a length of at least about 20–25 feet per strand, and typically at least about 50 feet. In other embodiments, the length continuous product may be up to about 150–200 feet, or even longer. The elongated product may be segmented or non-segmented, i.e., a length of chain-like linked items, or a strand or multi-stranded length of non-chain linked product. Other embodiments may load the elongated product in a series of non-looped discrete lengths. The discrete lengths may be any desired length or combinations of lengths, such as, but not limited to, lengths between about 1–20 feet.

The elongated food item may be elastic (at least in tension) so as to allow some stretching without unduly altering or deforming its desired shape and/or cross-section during processing. The elongated food item may be an extruded product that is held in a natural or synthetic casing as noted above. Other embodiments contemplate product that have rigid configurations but are movable link to link, such as chains of material having sufficient rigidity to retain its shape during processing and/or use (formed of a solid or composite metal, polymer, and/or plastic and the like).

In operation, in certain embodiments, the elongated product may have an exterior surface that, during the loading process, exhibits increased friction relative to a finished, cured, or dried configuration. For example, a processed meat mixture that is held in a collagen casing, prior to finishing, can be described as having a relatively gelatinous, sticky external residue that can cause the food to attempt to stick to a support surface.

Figure 2A:
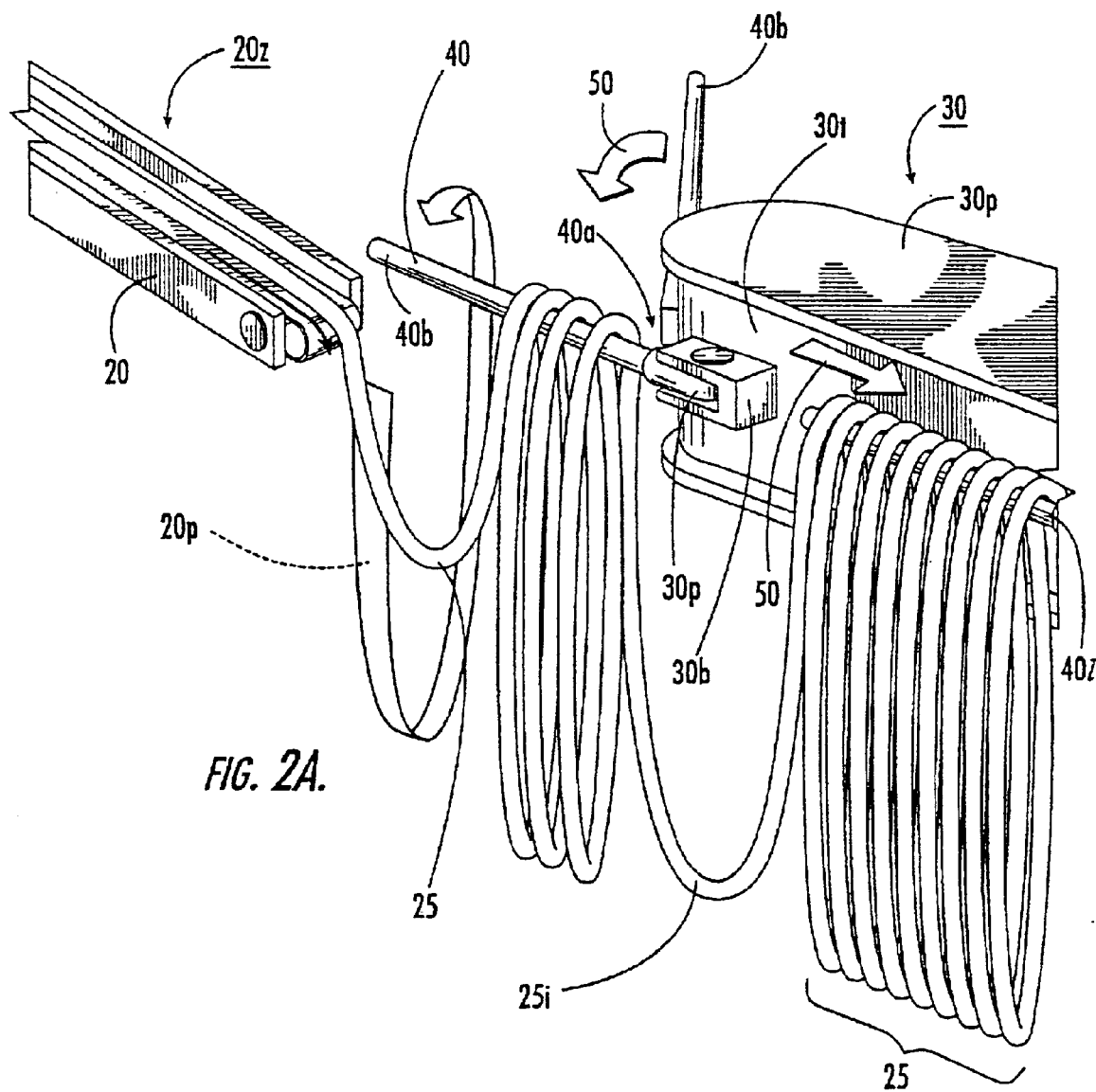
FIG. 2A is a perspective view of a portion of an automated rod positioning system and loading station according to embodiments of the present invention.

Turning now to FIG. 2A, one embodiment of an apparatus 30 for automatically providing, presenting, and/or positioning elongated support members 40 for loading is shown. The apparatus 30 is configured to hold and move serially, a plurality of spaced-part elongated support members 40 along a desired travel path 50 that is defined by a travel track 30t associated with the platform or carousel of the apparatus 30p which the members 40 follow. As shown, the automated apparatus 30 can be configured such that a portion is adjacent a product loading zone 20z that discharges elongated continuous lengths of product 25 therefrom. The apparatus 30 can be configured to serially automatically present (align and/or position) the support members 40 such that they are in cooperating communication with the loading equipment in the loading zone 20z.

The apparatus 30 includes a plurality of mounting brackets 30b that are operatively associated with the track 30t. The mounting brackets 30b are held in spaced apart intervals or locations about the track 30t or perimeter of the apparatus 30 and are configured to receive and releasably secure the end portion 40a of the elongated support member therein.

The mounting brackets 30b can hold the end portion 40a in a manner that allows the member 40 to pivot about a pivot joint 30p. The mounting brackets 30b are operatively associated with the track 30t that advances and moves the mounting brackets 30b, which, in turn, move the respective elongated support members 40, about the travel path 50. The mounting brackets 30b may be outwardly extending to allow for ease of alignment during loading. In other embodiments, the mounting brackets 30b may be flush with the track or mounted inwardly of the apparatus (not shown).

Figure 3:
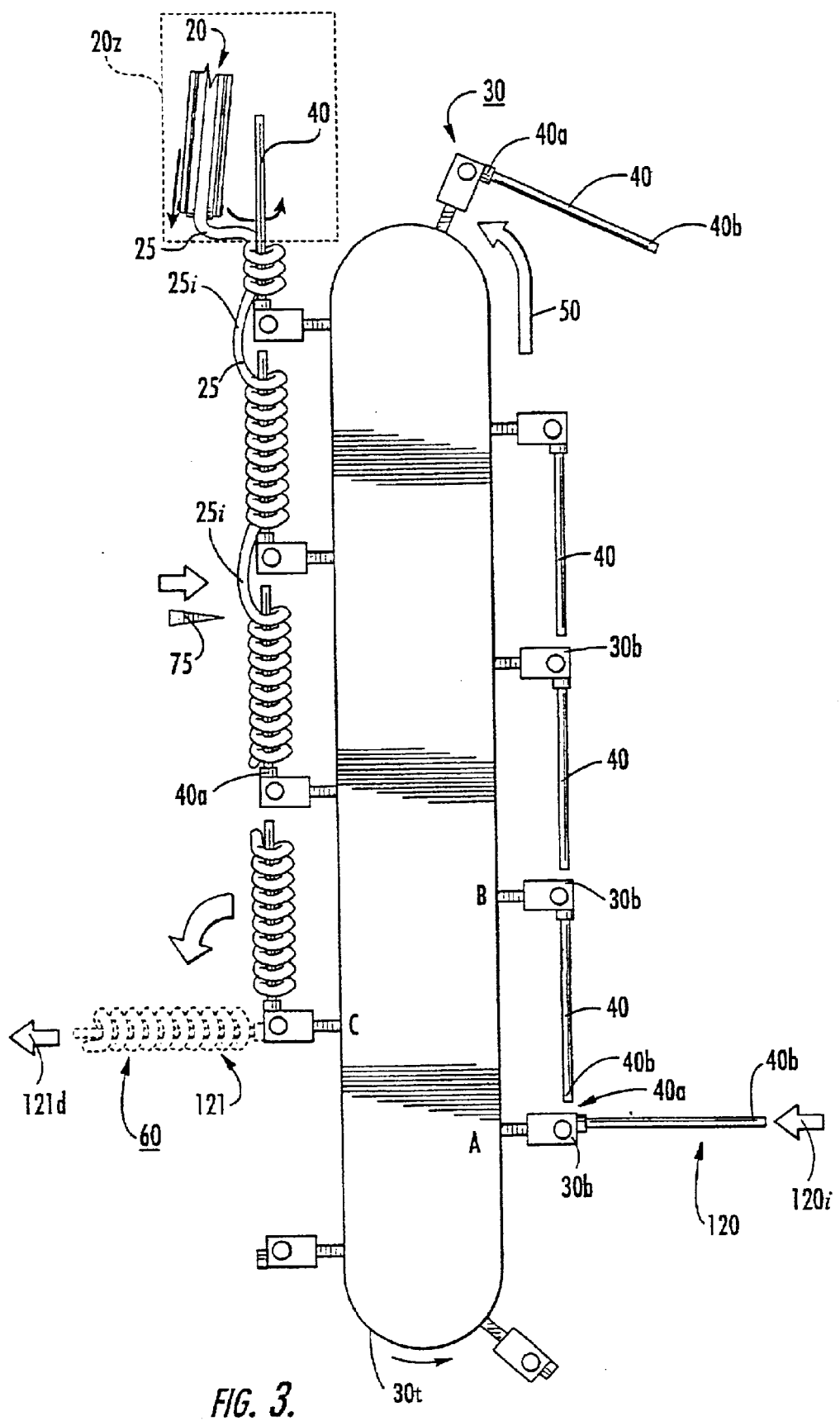
FIG. 3 is a schematic top view of an exemplary rod loading and/or positioning and removal system according to embodiments of the present invention.

The track 30t of the apparatus 30 may be endless and/or curvilinear as shown in FIG. 3. As is also shown in FIG. 3, the elongated members 40 can be configured to travel only a portion (typically a major portion) of the length of the track 30t. In the embodiment shown, empty support members 40 can be introduced individually at a first location "A" disposed upstream of a loading zone 20z and the loaded or filled support member 40 can be removed at second location "C", located downstream of the loading zone 20z. As such, the brackets 30b may travel without support members for a minor portion of the track 30t. Other track and path configurations may be employed and a common location or a plurality of entry/exit locations maybe used so that the elongated members 40 travel the entire or a subset of the length of the track 30t (not shown).

As noted above, a first end portion 40a of the elongated support members 40 can be pivotably attached to the apparatus 30 so that each is able to independently move with respect thereto. In operation, as shown in FIG. 3, this mounting configuration allows the second end portion 40b of the members to retract toward or extend away from the track 30t (toward and/or away from the carousel body or platform 30p of the apparatus) during operation.

The track 30t may be operatively associated with an advancement or drive system that moves the brackets 30b forward along the track or desired travel path. As such, the advancement system can comprise one or a series of conveyors, belts, cables, or chains, gearing, cams, or mechanical, electrical, pneumatic, hydraulic powered mechanisms, linkage assemblies, or combinations of same, as well as other suitable drive means and/or transport mechanisms.

In certain embodiments, the support members 40 travel substantially continuously at a substantially constant speed along a major portion, or all, of the travel path 50. In other embodiments, the members 40 may operate at a variable speed, or intermittently slow or halt to interrupt forward movement so as to allow the support members 40 and/or brackets 30b to dwell at a particular location for a desired amount of time.

FIG. 3 also illustrates that the elongated support member 40 can move from a first location "A" where it has a first orientation such that the elongated support member 40 is held substantially orthogonal to the direction of travel associated with the predetermined travel track 30t to a second location "B" with a different orientation. At location "B", as shown, the elongated support member 40 is held substantially parallel to the direction of travel associated with the predetermined travel track 30t. At location "C", the member 40 may be again rotated to be substantially orthogonal to the direction of travel associated with the travel track 30t. Location A may be associated with a new or "empty" member loading or supply station 120 (represented by the insertion arrow 120i), and location C may be associated with a loaded or "full" member removing station 121 (represented by the detachment arrow 121d). As such, the elongated support members 40 are individually releasably mounted to mounting brackets 30b spaced apart a distance so as to define the spacing between adjacent members 40 during operation. In use, "fresh" sanitized/sterilized support members 40 are individually introduced at one or more locations (shown as a single location A), and individually removed at one or more locations (shown as a single location B) after the members 40 are loaded.

In other embodiments, the elongated support members 40 can be configured to permanently mount to the track 30t and/or carousel 30 so as to repeatedly travel the circuit. In this embodiment, the food can be unloaded at a desired unloading station or stations, manually or automatically. "Permanently" as used herein means that the members 40 may be used repetitively during a production shift, remaining mounted, without requiring removal from the device 30. However, selected ones or all members 40 may be removed for periodic repair or cleaning as desired.

As shown in FIGS. 2A and 3, the loaded members 40 may be interconnected with intermediate lengths of product 25i strung between adjacent ones of the elongated support members 40. In such embodiments, as shown in FIG. 3, it may be desirable to cut the product along the intermediate segment 25i. FIG. 3 illustrates that such cutting may be carried out automatically with a cutting implement 75 configured to advance and cut the product 25 at desired time intervals set to correspond to the speed of the elongated members 40 so that adjacent members are detached and/or unconnected.

FIG. 2A illustrates that, in position in the loading zone 20z, the support member 40 is located in cooperating alignment with the loader that discharges the product onto the support member. As shown, the loader is a winder arm 20. However, other loader, discharge configurations, mechanisms, and devices may also be used to supply the product desired to be loaded.

As shown, the support member 40 extends within the perimeter of the travel path 20p defined by the translating winder arm 20. In certain embodiments, the support member 40 can be located so that it is centrally located within the boundary of the movement of the arm 20 during the loading operation. In other embodiments, the transfer member 40 can be asymmetrically positioned (such as closer to the top, bottom or one side of the winder arm 20). The direction of travel of the arm 20 is shown as counterclockwise in FIG. 2A, but may be configured to be clockwise as well. The support member 40 may be configured to travel proximate the loading zone 20z and downstream thereof in a unidirectional manner as the winder arm 20 translates to distribute multiple loops of product along a desired length of the support member 40. The timing, movement pattern, and product release rate, can be coordinated with the spacing of the support members 40 and the speed of movement of the support member 40 in the apparatus 30 to substantially continuously feed serially presented empty support members into the loading zone 20z after an immediately forward one is full and departs the loading zone 20z.

Figure 2B:
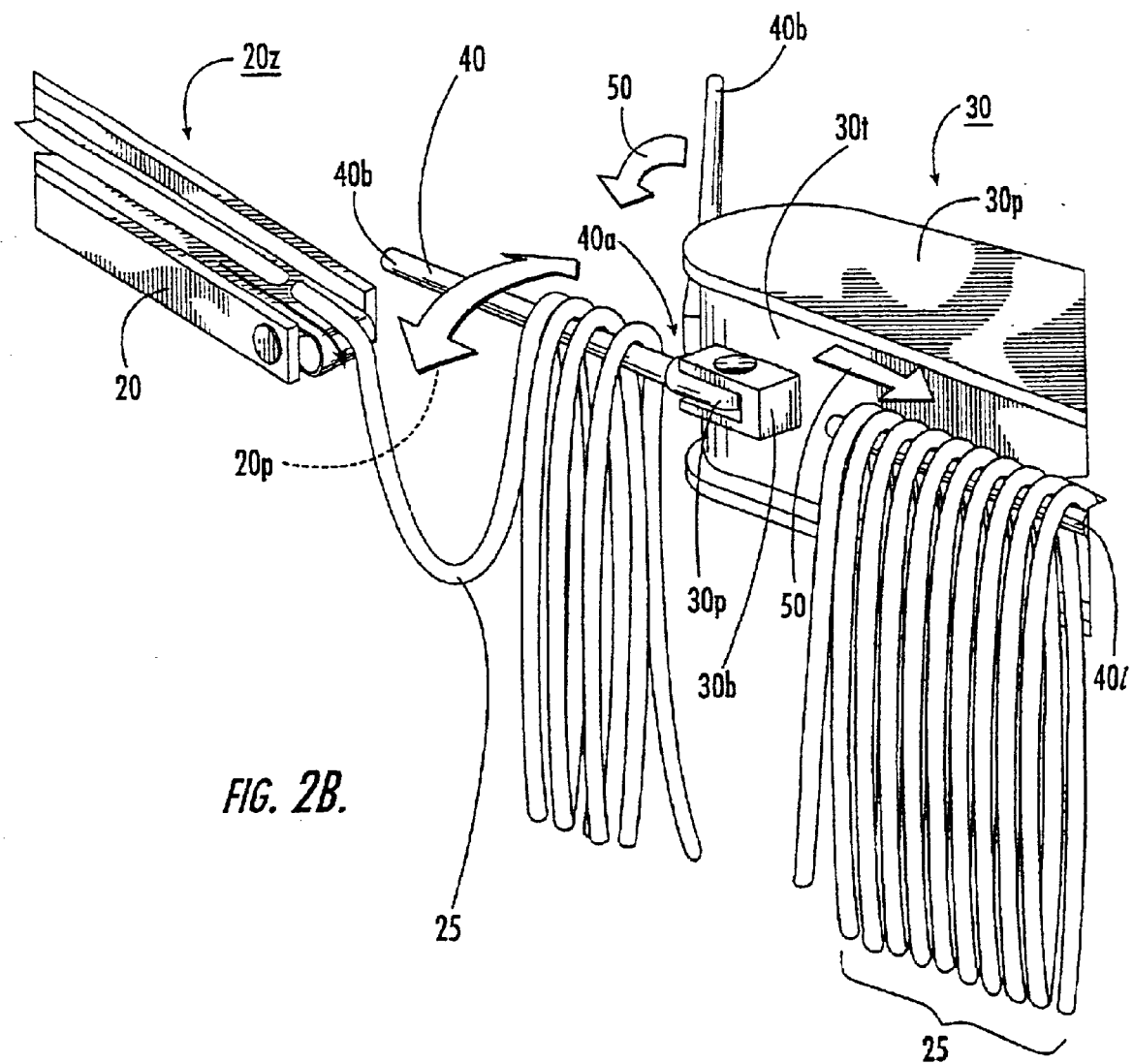
FIG. 2B is a perspective view of a portion of an automated rod positioning system and loading station according to alternative embodiments of the present invention.

As shown by the arrow in FIG. 2A, the winder arm 20 can move in a predetermined directional pattern 20p which is a closed path including two different axis of travel, typically including both X and Y axis directional components. The closed path may be shaped in any desired suitable configuration, including, but not limited to, oval, teardrop, circular, elliptical, hourglass, square, or rectangular, so that, in operation, it causes the elongate product to wrap to the desired configuration. FIG. 2B illustrates that the winder arm 20 may be configured to move in a transverse (open or closed) pattern 20p so as to serially load or drape over the member 40 discrete lengths of non-looped elongated suspended lengths of product along the support member 40.

Figure 13A:
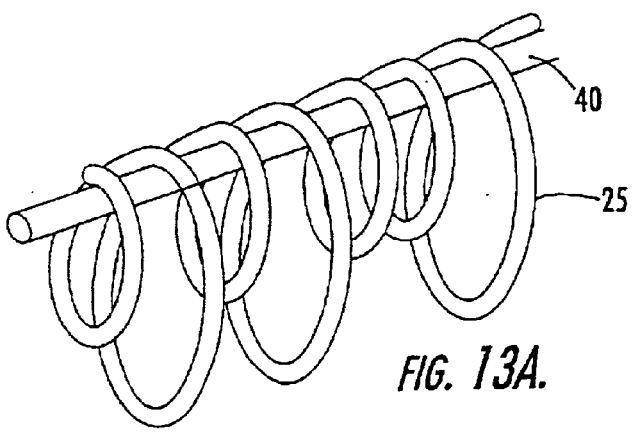
FIG. 13A is a side view of a loaded support member according to embodiments of the present invention.
Figure 13B:
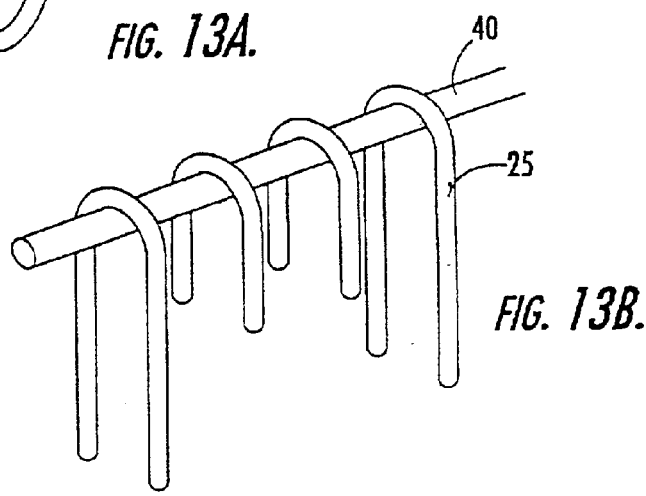
FIG. 13B is a side view of a loaded support member according to embodiments of the present invention.

The elongated continuous or discrete length of product may be loaded so that it has substantially uniform suspended lengths along the member 40 as shown in FIG. 2A or 2B or may be loaded to provide non-uniform suspended lengths of product 25 (FIGS. 13A, 13B).

The winder arm 20 may be programmably configured to alter its winding pattern, winding speed, and the like, depending on the product being processed. In any event, the winder arm 20 is configured to move a sufficient distance above and below the support member 40 so as to load or loop the elongate product 25 thereon.

Figure 1B:
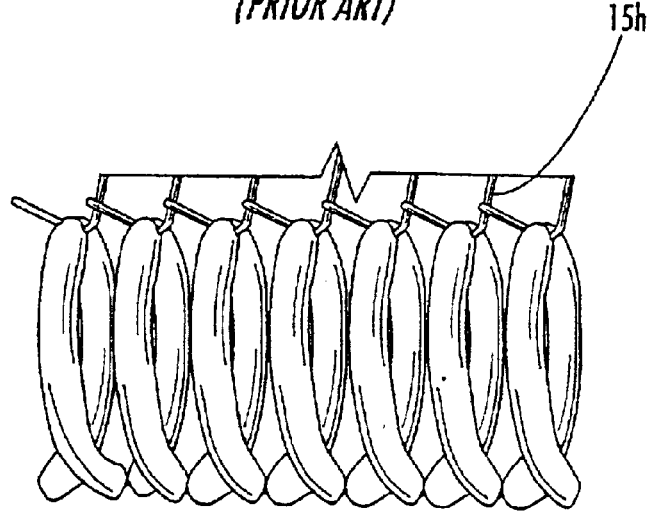
FIG. 1B is an enlarged view of the looping hooks of the device shown in FIG. 1A showing an elongated extruded encased food product suspended thereon.
Figure 1C:
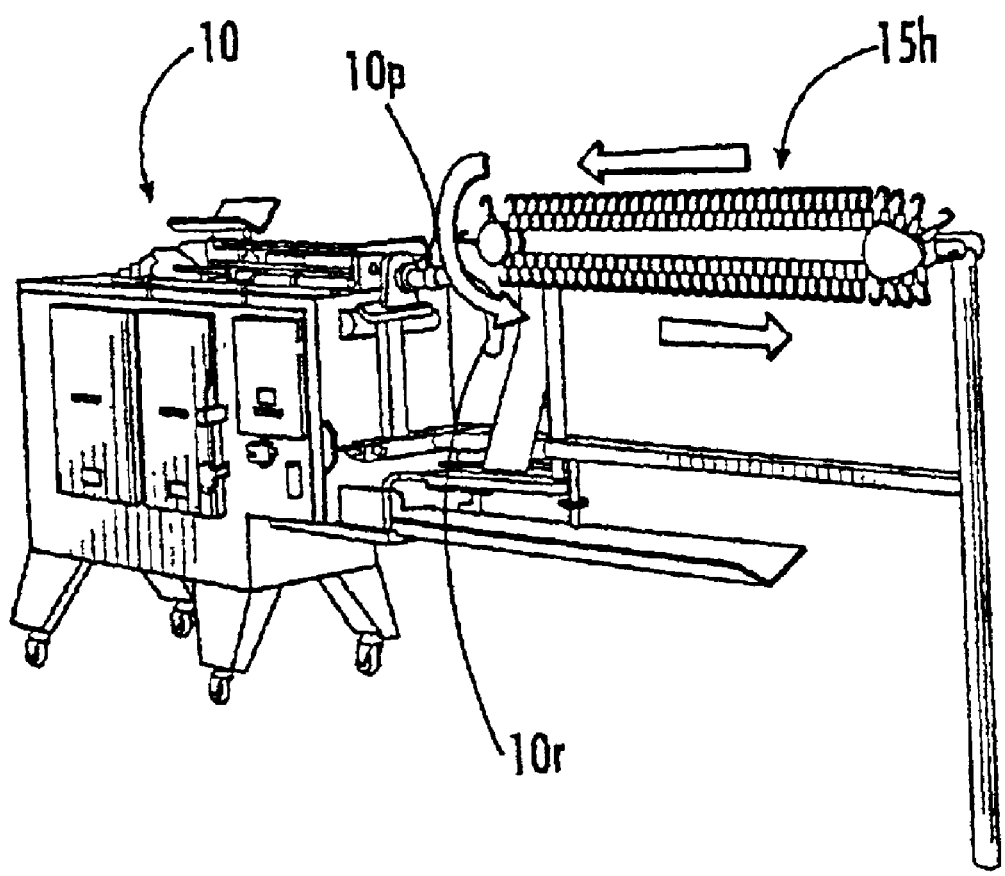
FIG. 1C is a perspective view of another prior art stuffer and linker.

In certain embodiments, the upstream processing station that feeds the winder arm 20 can be the extruder 10 (such as the conventional extruders shown in FIGS. 1A–1C) and the upstream portion of the winder arm 20 can be positioned proximate to, and in cooperating alignment with, a discharge port 10p of the extruder (or stuffer) 10 or intermediately positioned member such as a chute.

In operation, as shown in FIGS. 2A, 2B the elongated support member 40 can be aligned with the winder arm 20 at a first position that is toward the upstream end of the arm 20 and during loading can be gradually translated (typically unidirectionally) to be closer to the downstream end of the arm 20 all at substantially the same height so that the support members 40 are held in a substantially level manner during and after loading. Moving the support member 40 during the loading operation can distribute multiple loops of product over the desired length of the member 40.

In certain embodiments, the support member 40 moves at a substantially constant speed along the track 30t that may be synchronized and/or responsive to one or more of the speed of the winding (speed of the arm), the speed of forward movement of the product 25 as it exits the arm 20, and the desired looping arrangement/configuration (length of the loops or suspended lengths) on the member 40.

The length of the winder arm 20 can vary depending on various factors, such as, but not limited to, the size of the product, the forward speed of the product, the desired winding pattern and the like. In certain embodiments, the length of the arm 20 is sized to be at least the length of the transport member 40. In other embodiments, the length of the support member is at least about 2 feet, and typically at least about 3 feet. In certain embodiments, the support member 40 can be about six feet long.

Various automated detectors can be placed at desired locations along the apparatus 30 and/or winder arm 20 to verify proper operation and to render an alert when an abnormality is indicated. Examples of such detectors include optical detectors (infrared or otherwise that respond to changes in visual intensity or generated light beams), flow meters, pressure meters, temperature sensors, and the like.

In certain embodiments, the speed of the track 30t and/or support members 40 held and advanced by the apparatus 30 may be between about 2–10 ft/min, and in particular embodiments, at about 4–6 ft/min.

Figure 4:
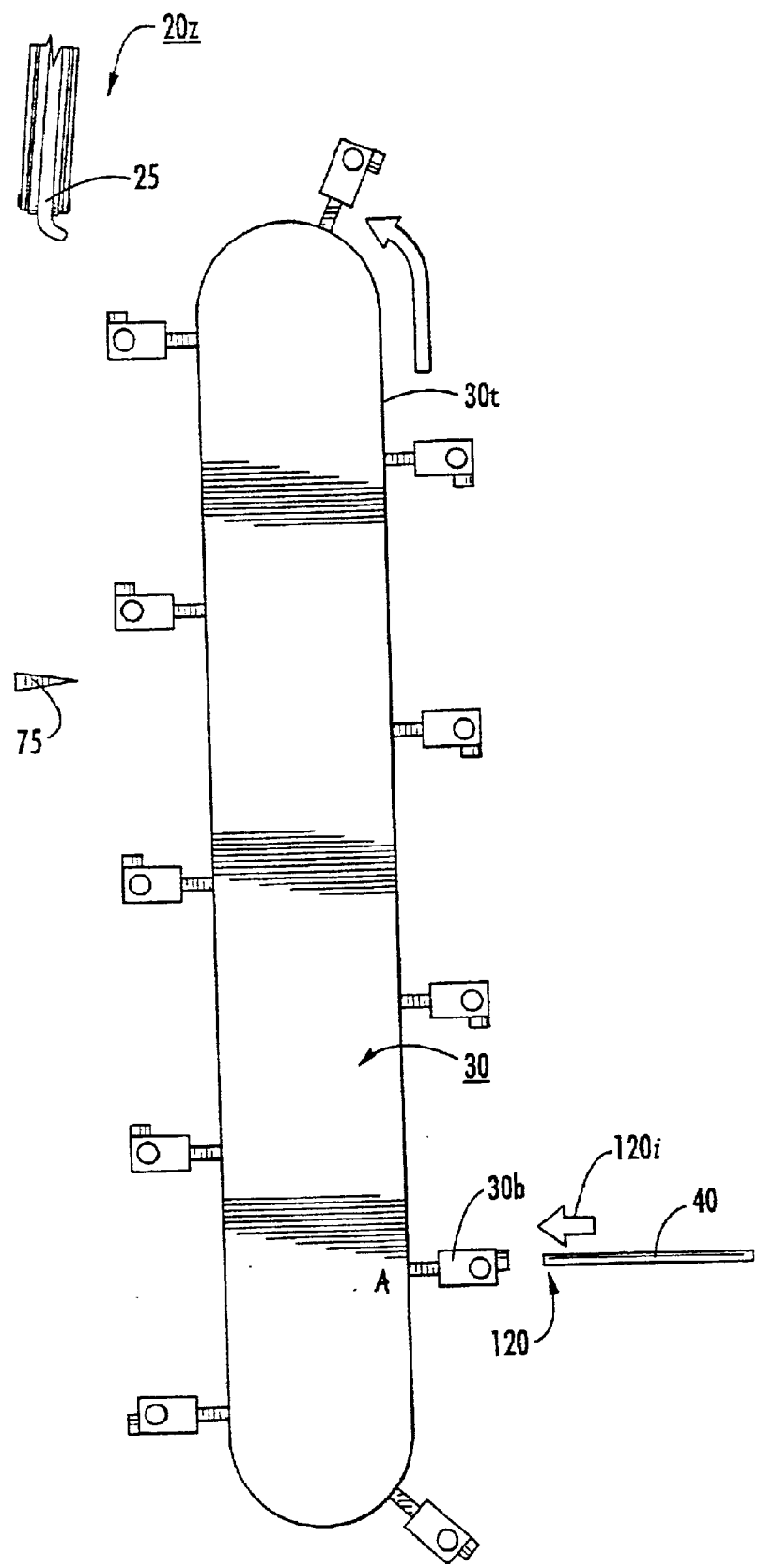
FIGS. 4–9 are schematic top views of a sequence of operations illustrating the movement of a single rod along its predetermined travel path showing empty (FIGS. 4–6) and loaded (FIGS. 8 and 9) configurations or combinations thereof according to embodiments of the present invention.

FIGS. 4–9 illustrate a sequence of operations following a single support member 40 through an exemplary travel path provided by the positioning apparatus 30. FIG. 4 illustrates the initial loading or supplying of a (empty) support member 40 onto the apparatus 30 at the supply station 120. In this embodiment, the support member 40 is loaded into the bracket 30b at an introduction location (shown as position A) in an orientation that is different from its upstream orientation. As shown by the curvilinear arrow, the track 30t continues to move the receiving bracket 30b forward during the supply step, automatically bringing the next adjacent bracket 30b forward to repeat the loading process.

Figure 5:
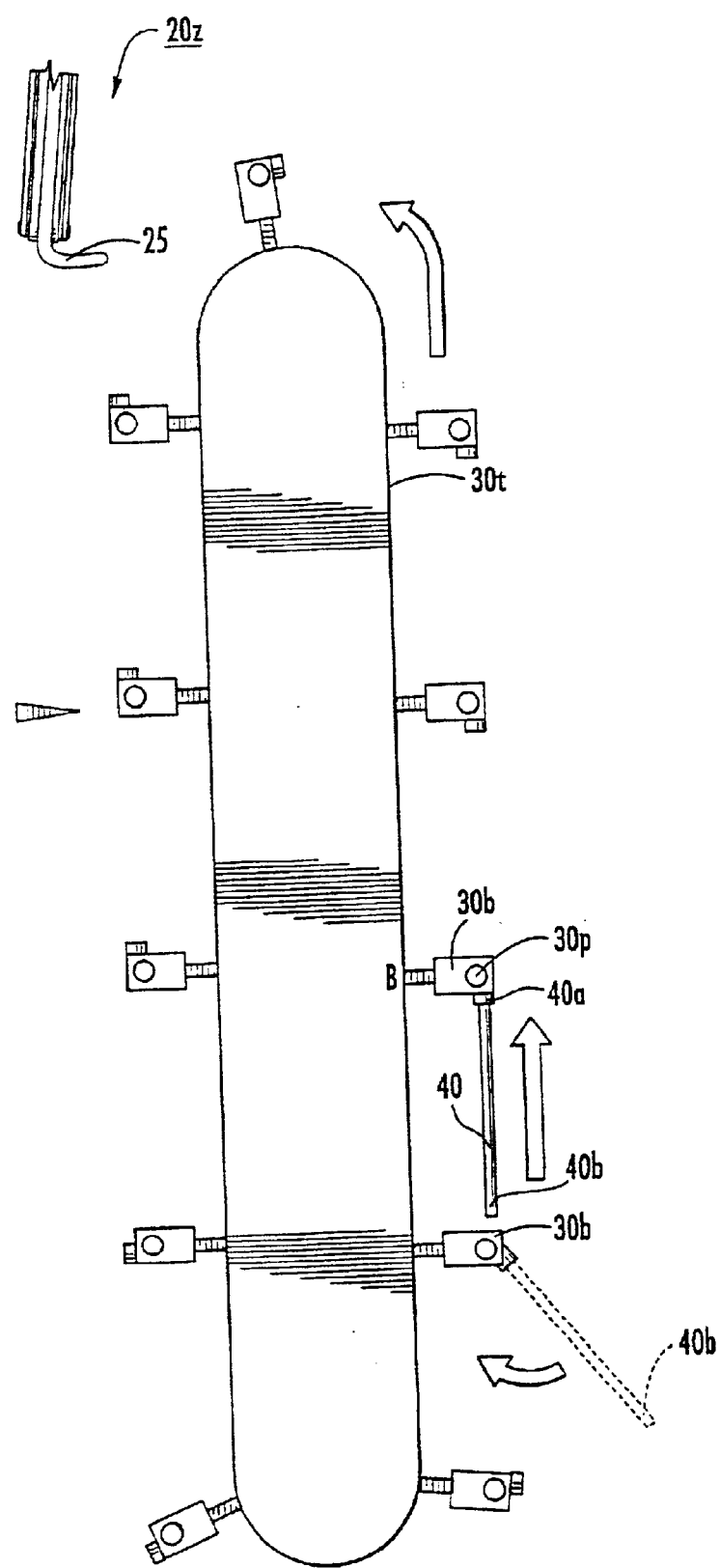

FIG. 5 illustrates that after or during insertion (proximate, and typically, downstream of location A) into the bracket 30b, the support member 40 can be reoriented and aligned so that the outer portion 40b of the support member 40 can be rotated inwardly. In the embodiment shown, the support member 40 pivots so that it is disposed substantially parallel to and evenly spaced with respect to the track 30*t* or apparatus 30 along the length of the support member 40. At full operational capacity, the apparatus 30 positions the support members 40 so that each is spaced apart but adjacent the support members 40 that are positioned immediately forward and rearward thereof about a major portion of the track 30*t* as shown in FIG. 3.

Figure 10A:
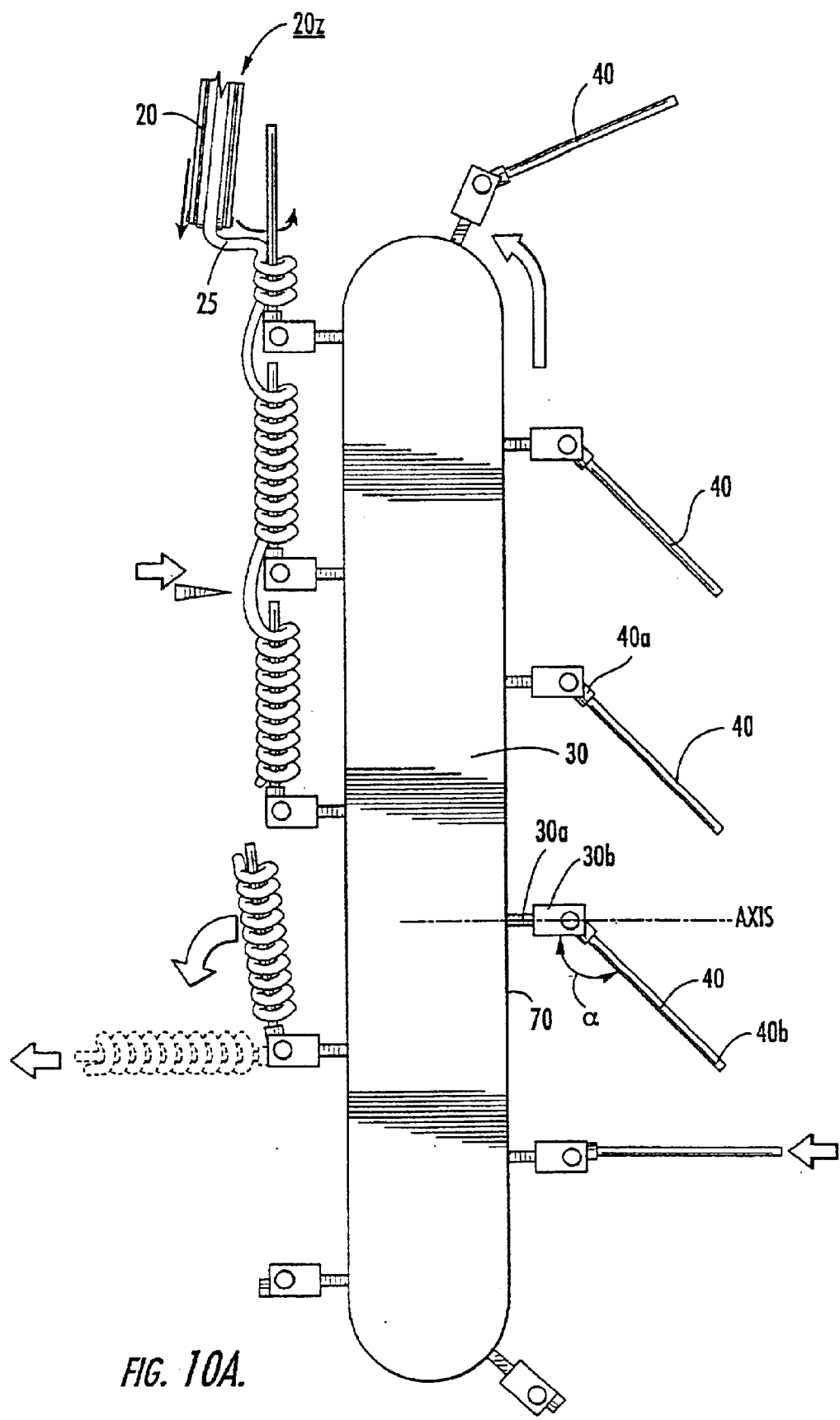
FIG. 10A is a schematic top view of an alternative configuration of an automated positioning and removal system for supplying a continuous supply of empty rods for loading according to embodiments of the present invention.
Figures 10B, 10C:
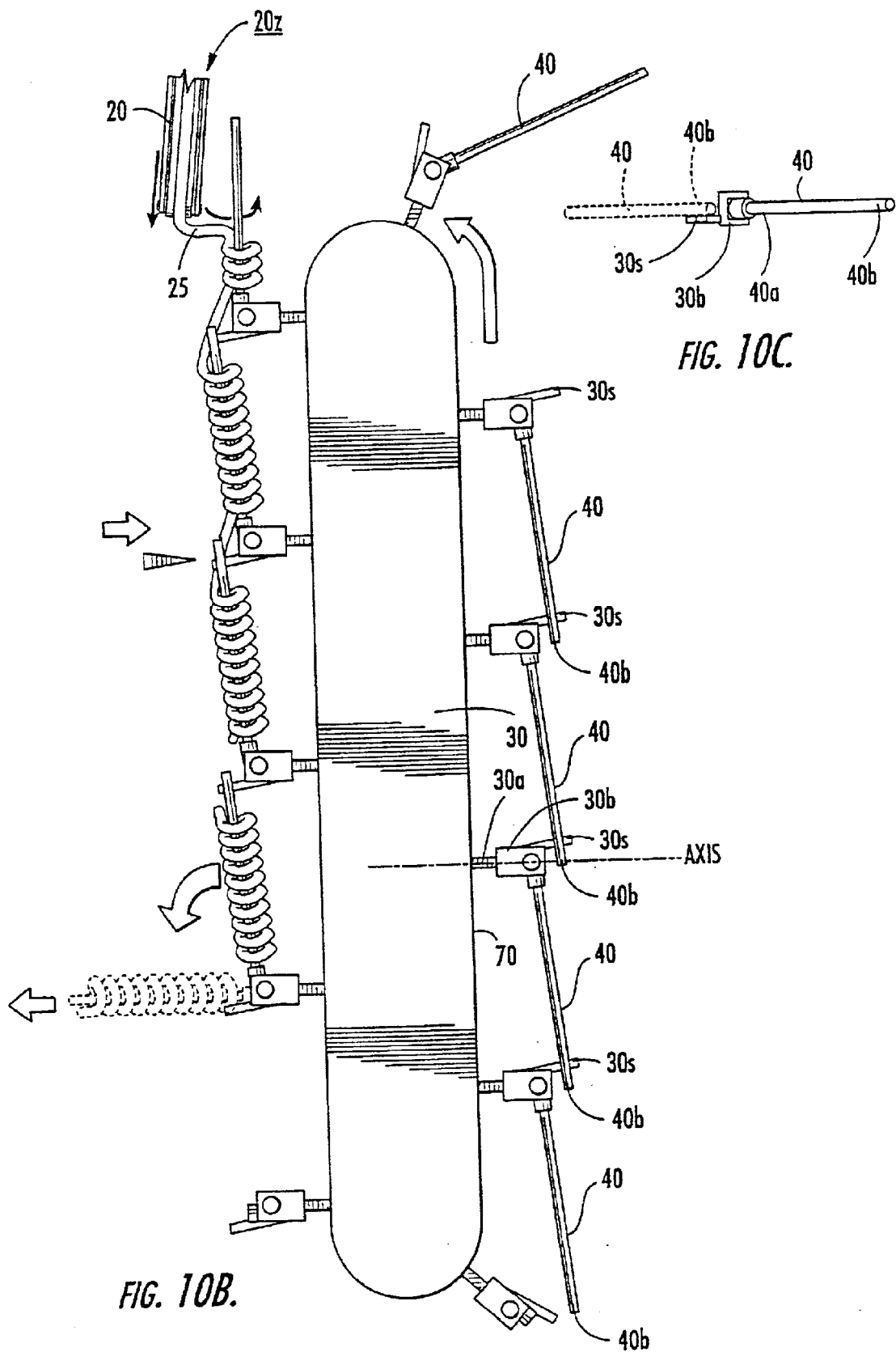
FIG. 10B is a schematic top view of an alternative configuration of an automated positioning and removal system for supplying a continuous supply of empty rods for loading according to embodiments of the present invention.
FIG. 10C is a side view of a portion of a mounting configuration for a support member shown in FIG. 10B according to embodiments of the present invention.

FIG. 10A illustrates that the support members 40 may be held by the apparatus 30 such that when viewed from the top, they present an angular orientation relative to the carousel 30, so that the first portion 40*a* is held closer the track 30*t* than the second portion 40*b*. As shown in FIG. 10A, as viewed from the top, the support members 40 can be held during a portion of travel along the travel path at an obtuse angular orientation "α" that is greater than 90 degrees, typically from about 120–160 degrees, from the axis defined by an axis line (shown in broken line) extending through the bracket arm 30*a* and associated pivot joint. In other embodiments, the support members 40 may be held to be in substantially straight alignment throughout a major portion of the travel circuit. As shown in FIG. 10B, the support members 40 may be mounted on the carousel while in other embodiments the support members may be oriented to taper inwardly relative to the travel direction (not shown).

In certain embodiments, as shown in FIGS. 2A and 2B, the support member 40 is held in the apparatus or platform so that it has a free length that can be readily accessed for loading (such as aligned and positioned) at the loading zone 20*z*. As also shown in FIGS. 2A, 2B, and 4–9, one end portion 40*b* can be configured to remain free during its travel along the travel path or track 30*t*. In other embodiments, both end portions 40*a*, 40*b* of the members 40 may be held against the carousel 30 (such as via a double bracket holding arrangement) (not shown). The end portion that is held may be the end or an inward portion of the member 40. In other embodiments, one or more mounting locations may be used as well as an intermediately positioned (between the opposing end portions) mounting location may be used.

In other embodiments, as shown in FIG. 10B, a first end portion 40*a* of a support member 40 can be mounted in the bracket 30*b* with a second end portion 40*b* held in a secondary bracket 30*s* that may be disposed on a different adjacent primary bracket 30*b* (or on the track as a secondary bracket (not shown)) spaced from the first bracket 30*b*. As shown in FIG. 10B, a first end portion 40*a* of the support member can be held in the first bracket 30*b* and the second end portion 40*b* can be held on a rear bracket 30*s* that may be mounted to a bracket 30*b* located downstream of the bracket 30*b* holding the first end portion 40*a* of the support member. FIG. 10C is a side view that illustrates the secondary bracket 30*s* incorporated into the holding bracket 30*b*.

FIG. 10B also illustrates another example of a holding configuration and orientation for the support members 40 along the travel path. As shown, the support members 40 have a length and are in spaced apart relationship so that the rearward portion 40*b* of an upstream member 40 extends proximate to or beyond the corresponding adjacent downstream bracket 30*b*. In the orientation shown, the support member 40 tapers outwardly slightly from front to back, so that the rearward most portion of a forward member 40*b* resides proximate to but outwardly of the boundary of the front-end portion 40*a* of the adjacently located downstream or rearwardly positioned support member 40.

The support members 40 may be manually or automatically turned to a desired orientation or orientations along the travel path. In certain embodiments, a guide mechanism (not shown) can be disposed downstream of the introduction location A (FIG. 4) that deflects the support member 40 to a desired orientation. In other embodiments, the bracket 30*b* can be configured with a cam, linkage, or other internally mounted mechanism (not shown) that is operated to cause the support member 40 to turn to a predetermined orientation(s) as it travels along the track 30*t*.

Figure 6:
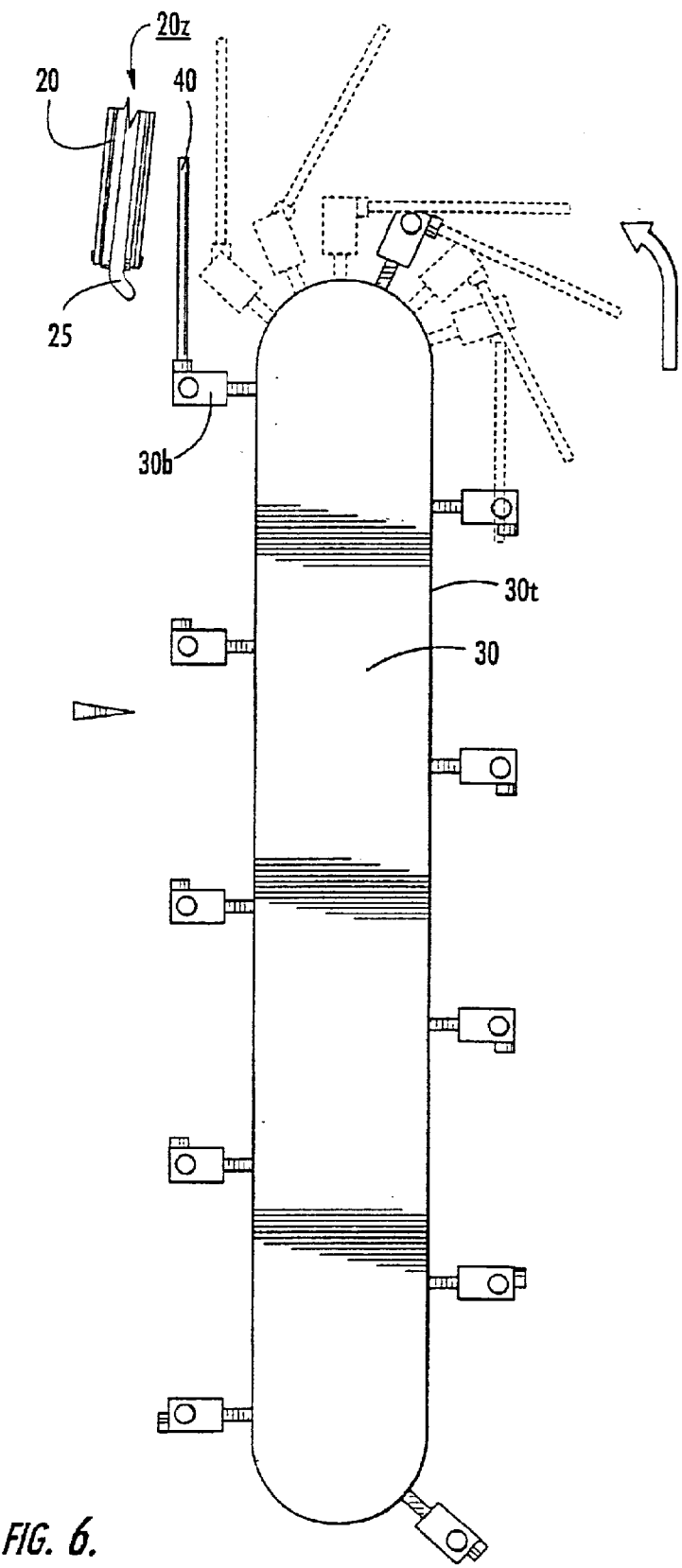

FIG. 6 illustrates, in broken line, a series of orientations that the support member 40 moves through as it travels in the arcuate region of the travel path to be aligned and positioned in cooperating relationship with the loading zone 20*z*. It is noted that where the apparatus 30 has only linear tracks, such a pattern will not be required (not shown).

Figure 7:
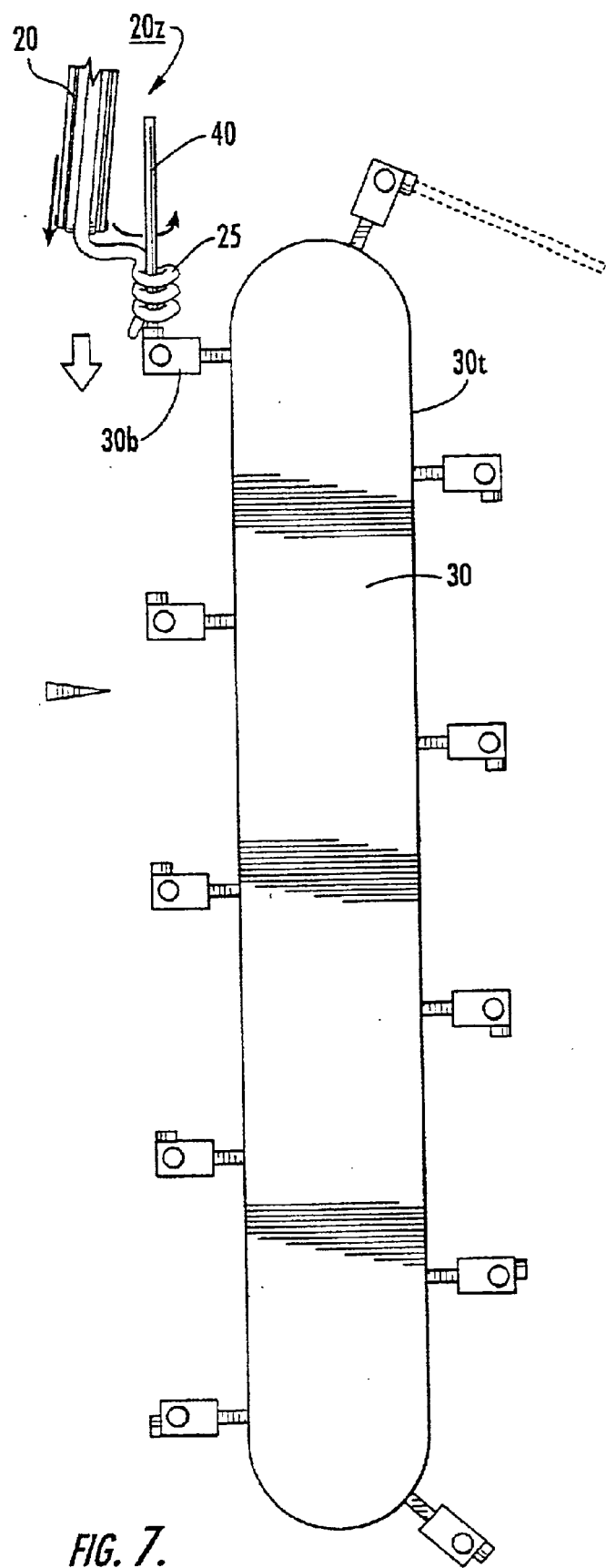

FIG. 7 illustrates that in certain embodiments, as the member 40 progresses forward at and/or away from the loading zone 20*z*, the member 40 can travel in unidirectionally. As shown, the member 40, during and after loading with product 25, can be held and moved so that it has a straight travel pattern with the member 40 held level (substantially horizontally to keep the loops of product distributed along the length of the member) and parallel to the travel track 30*t*.

Figure 8:
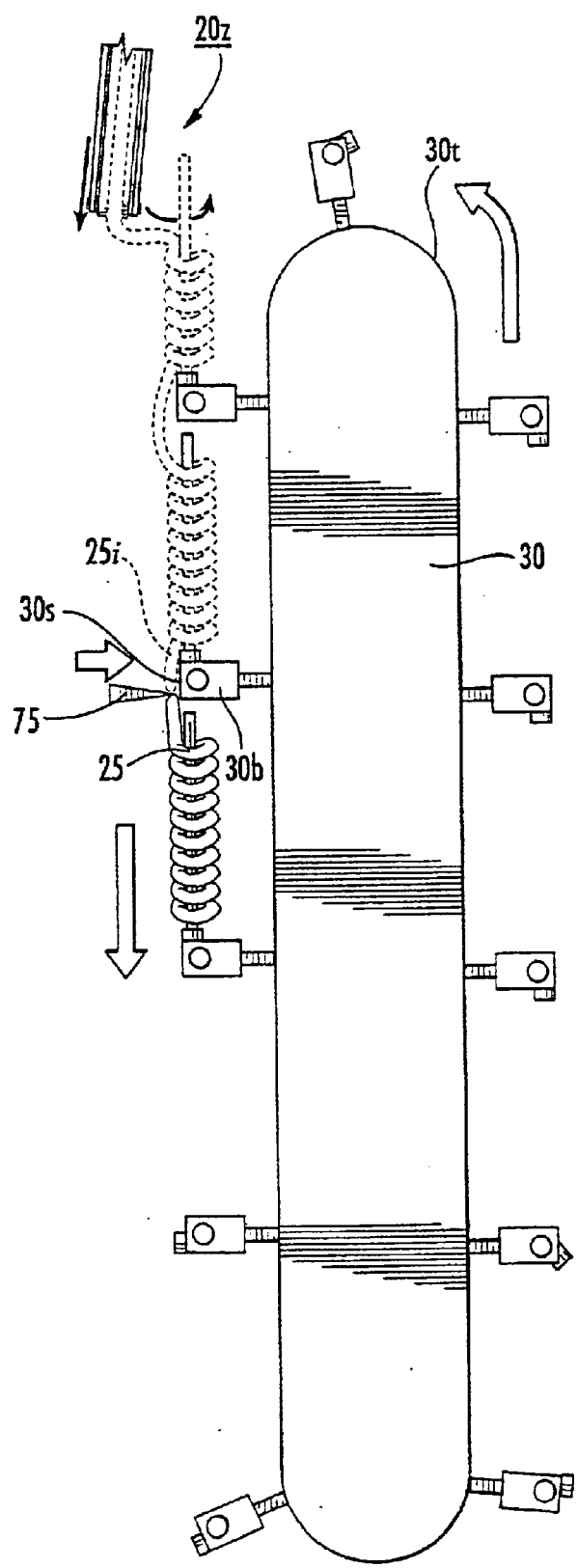

FIG. 8 illustrates that the intermediate length of product extending between two adjacent support members 40 downstream of the loading zone 20*z* can be parted or split. The parting can be automatically or manually performed while the adjacent support members 40 are moving, typically without disrupting the normal speed and/or continuous flow of product/support members 40 along the track 30*t*. The bracket 30*b* may include an outer surface configuration 30*s* that provides a solid cutting surface that is sufficient to receive the sharp edge contact of a cutting implement and/or the associated cutting force over a suitable component life. Other cutting means can also be used, including, but not limited to, lasers, ultrasonic devices, water jets, and the like.

Figure 9:
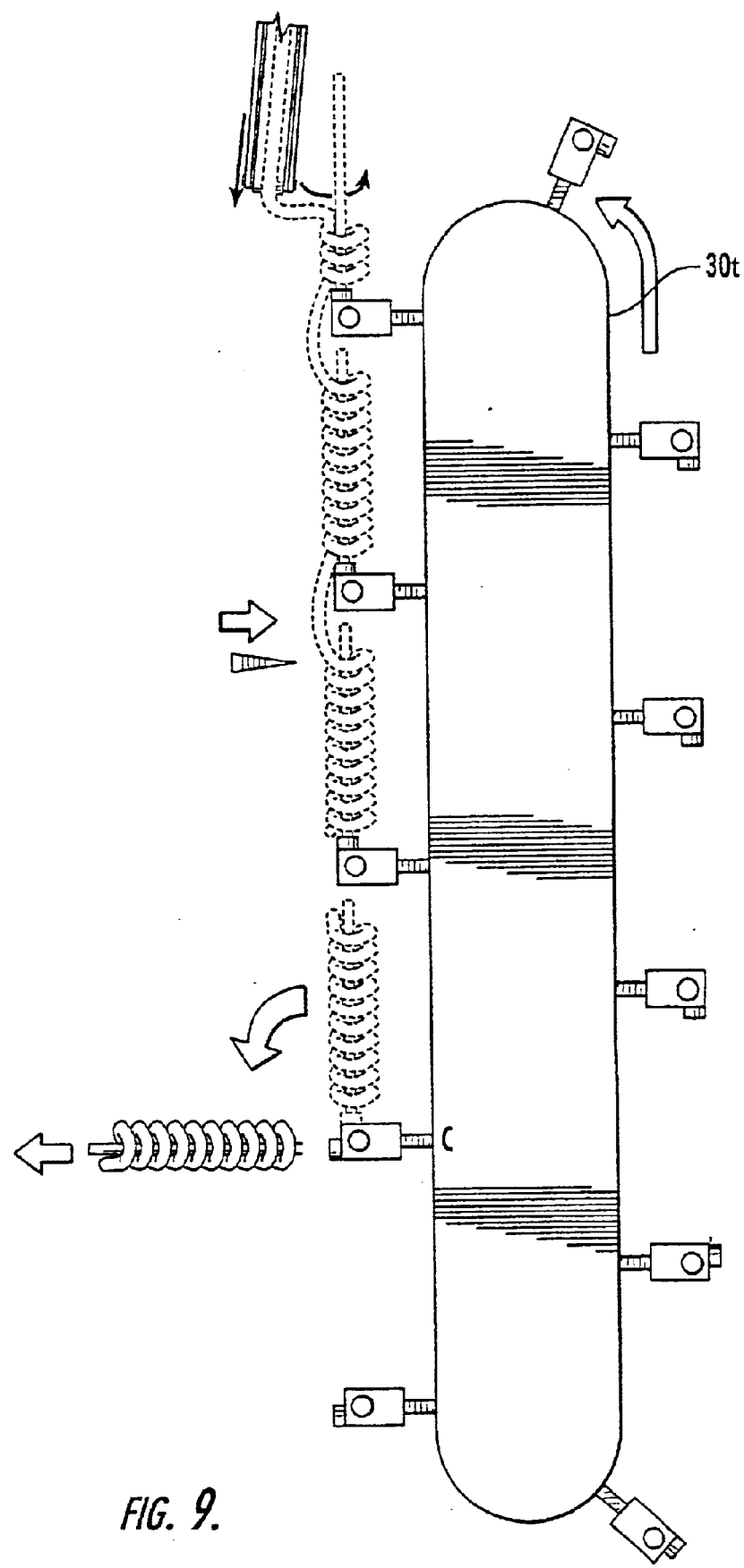

FIG. 9 illustrates that the support member 40 loaded with product 25 can be detached from the apparatus 30 at removal location "C". The detachment can be performed while the support member 40 is held at a desired removal orientation. As shown, the support member 40 is moved so that the second end portion 40*b* extends outwardly from the body of the apparatus 30 which may provide easier removal and/or external access to the loaded member 40.

Although illustrated as having particular loading and supply member introduction and removal locations, it is noted that other locations can be selected. For example, a plurality of different introduction locations can be used, so that a particular location loads every other bracket that passes thereby. Similarly, a plurality of different removal locations can be selectively used. In other embodiments, the supply members are mounted to travel repeatedly along the circuit to allow a number of loading operations thereon and hence, remain in position during the removal (with no single introduction or loading location needed). At a desired time, the food can be lifted, scooped, or otherwise removed from the support members 40 (at one or more desired locations). It is also noted that the support member 40, although shown as being introduced at a 90-degree orientation in certain of the figures such as FIG. 4, may employ other desirable entry or loading orientations. In addition, the support members 40 need not move into parallel alignment to the platform 30 as they travel along the track 30*t*. Instead they may be loaded into this orientation and remain this configuration along a major portion of the travel path or travel in alternative orientations.

In certain embodiments, two loading stations can be positioned and opposing ends of the apparatus (not shown). In these embodiments, the apparatus 30 can be configured with a sufficient length and/or configuration to include two different sets of introduction, loading, and removal locations, potentially increasing the loading capacity.

Figure 11A:
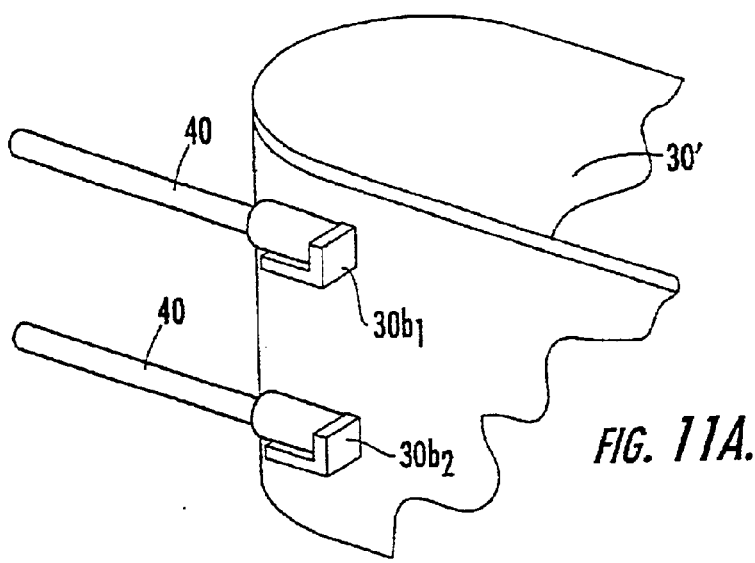
FIG. 11A is a perspective view of a portion of an apparatus that can hold, advance, and concurrently position pairs of elongated support members according to embodiments of the present invention.
Figure 11B:
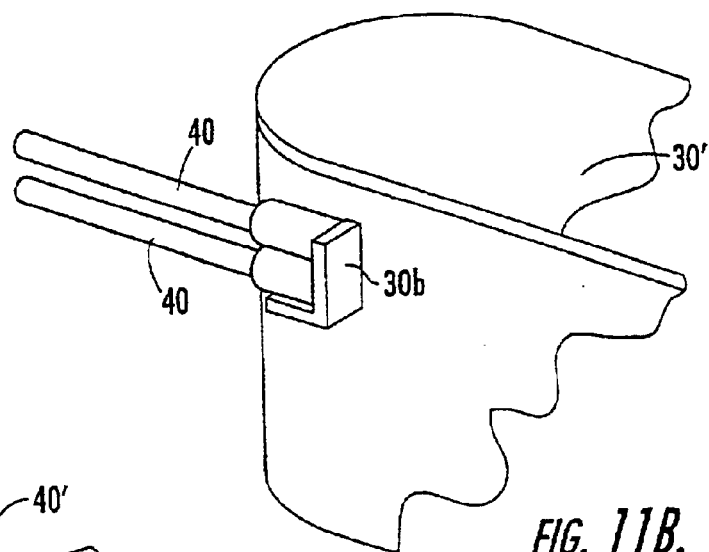
FIG. 11B is a perspective view of a portion of an apparatus that can hold, advance, and concurrently position pairs of elongated support members according to other embodiments of the present invention.

It is also noted that, in certain embodiments, as shown in FIG. 11A, the apparatus 30' may be configured with a corresponding pair of dual brackets 30$b_1$, 30$b_2$ at each, or selected ones, of the support member mounting positions. As such, the apparatus 30' can be configured to receive a pair of independent overlying aligned elongated support members 40 that are held in the apparatus 30' to be vertically spaced apart and concurrently moved to be simultaneously loaded with product. In this embodiment, the winder arm 20 moves a distance in its winding pattern that is sufficient to envelope and/or move around the perimeter defined by the two spaced apart rods, the upper one suspending the product 25 and the lower one helping to provide a lower dimension for the looped product. FIG. 11B illustrates that a pair of support members 40$_1$, 40$_2$, may be held in a single bracket 30$b$ that defines the alignment orientation and pivotability of the members 40.

Figure 11C:
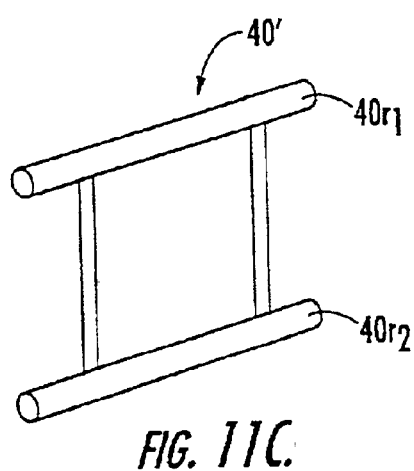
FIG. 11C is a perspective view of another alternative configuration of an elongated support member according to embodiments of the present invention.
Figure 11D:
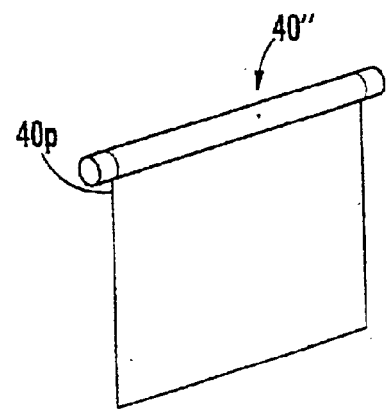
FIG. 11D is a perspective view of an additional alternative configuration of an elongated support member according to embodiments of the present invention.

FIGS. 11C–11E illustrate examples of alternate embodiments of support members 40. As shown in FIG. 11C, the support member 40' may be configured as a pair of rods 40$r_1$, 40$r_2$ that may be attached. FIG. 11D illustrates that the support member 40" may be configured with a continuous sheet of material, the upper portion may have additional width and/or at least one end portion (shown as two) that allows for insertion into the bracket 30$b$. The body of the support members may be solid, perforated, foraminated, or include one or a plurality of apertures or be otherwise configured to reduce weight and/or promote airflow therethrough. Similarly, the member 40 may include one or more handles or other externally accessible handling means disposed along the length and/or at selected end portions thereof to promote ease of handling to transport the loaded member to a trolley or another active station (not shown).

Figure 12A:
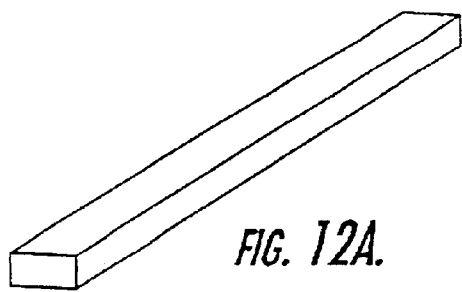
FIG. 12A is a perspective view of an additional alternative configuration of an elongated support member according to embodiments of the present invention.
Figure 12B:
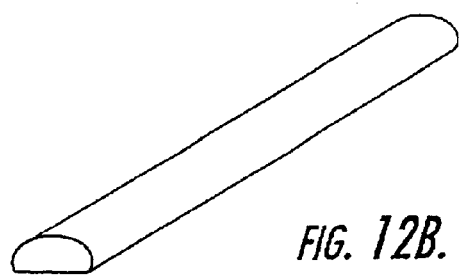
FIG. 12B is a perspective view of an additional alternative configuration of an elongated support member according to embodiments of the present invention
Figure 12C:
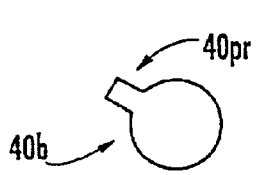
FIG. 12C is a cross-sectional view of an elongated support member according to embodiments of the present invention.
Figure 12D:
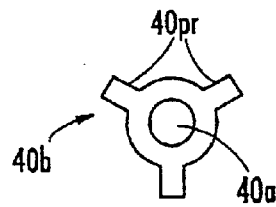
FIG. 12D is a cross-sectional view of another elongated support member according to embodiments of the present invention.
Figure 12E:
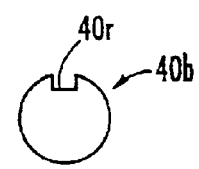
FIG. 12E is a cross-sectional view of an additional elongated support member according to embodiments of the present invention.

Examples of other configurations of support members 40 are shown in FIGS. 12A–12E. These examples are non-limiting to the contemplated scope of the invention as there are many suitable support member configurations as will be appreciated by those of skill in the art. FIG. 12A illustrates that the support member 40 may be configured as a planar bar. FIG. 12B illustrates a support member 40 configured as a rod with a semi-circular cross-sectional profile. FIG. 12A illustrates that the support member 40 may include a protrusion 40$pr$ that is configured to mate with the bracket 30$b$ to help releasably secure the support member 40 to the apparatus 30. Similarly, FIG. 12D illustrates that, at least one end portion 40$b$ of the support member may be configured with a plurality of outwardly extending protrusions to releasably engage with the bracket 30$b$. FIG. 12D also illustrates that at least one end portion of the support member 40$b$ may include an aperture 40$a$ that may be used to help secure the support member 40 to the bracket 30$b$ and/or to reduce the weight thereof. FIG. 12E illustrates that at least one end portion 40$b$ of the support member may include a recess that can lock in position to releasably secure it to the apparatus 30.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method for supplying support members to a product loading station and automatically removing loaded support members therefrom, comprising:

advancing, in serial order and in spaced-apart relationship, a plurality of elongated support members having opposing first and second ends and an associated length, along a selected travel path to a loading station;

automatically loading each of the elongated support members individually over a generally horizontal length thereof with suspended elongated product formed into greater than three loops and/or greater than three discrete lengths of suspended elongated product at the loading station; and automatically advancing the loaded elongated support members away from the loading station along the selected travel path to cause the loaded elongated support members to travel downstream of the loading position.

2. A method according to claim 1, wherein the selected travel path includes a linear portion, and wherein the loading step is carried out while the respective elongated support member being loaded is automatically advancing forward along the linear portion of the selected travel path with the elongated support member held generally horizontal with the loop or discrete lengths held in close proximity to each other on the elongated support member.

3. A method according to claim 1, wherein a portion of the selected travel path is curvilinear.

4. A method according to claim 3, further comprising pivotably rotating the elongated support members side to side from a first orientation where the elongated support member is disposed substantially orthogonal to the direction of travel associated with the selected travel path to a second orientation wherein the elongated support member is held substantially parallel to the direction of travel associated with the selected travel path.

5. A method according to claim 4, wherein the elongated members pivot from the first orientation to the second orientation as they advance along a portion of the selected travel path before said loading step.

6. A method according to claim 1, wherein each elongated support member is a substantially straight rod that is at least about 2 feet long.

7. A method according to claim 1, wherein the advancing steps are carried out automatically at a substantially constant speed.

8. A method according to claim 1, wherein the advancing steps are performed substantially continuously to load a plurality of elongated support members.

9. A method according to claim 1, wherein the selected travel path is generated by an associated predetermined endless travel track, and wherein the elongated members travel less than the entire circuit length of the predetermined travel track.

10. A method according to claim 1, wherein the loading step comprises automatically translating a winder arm about a winder path that moves the winder arm across a top portion of the elongated support member a plurality of times as the product is looped and/or draped onto the elongated member.

11. A method according to claim 9, further comprising introducing empty elongated support members to the predetermined travel track individually at a location that is upstream of the loading station.

12. A method according to claim 9, further comprising detaching the elongated loaded support members individually from the predetermined travel track at a location that is downstream of the loading station.

13. A method according to claim 1, wherein the elongated support member is a generally straight rod that is disposed generally horizontal substantially level at a generally constant vertical height during at least the loading and subsequent advancing steps.

14. A method according to claim 1, further comprising releasably holding a first end portion of the elongated member adjacent the predetermined travel track in a manner that allows the second end portion to automatically laterally pivot during at least the first advancing step.

15. A method according to claim 1, further comprising permanently holding a first end portion of the elongated member adjacent the predetermined travel track in a manner that allows the second end portion to automatically laterally pivot during at least the first advancing step.

16. A method according to claim 1, wherein the loading step is carried out so that a continuous length of product extends intermediately between adjacent ones of the loaded elongated members.

17. A method according to claim 16, further comprising automatically cutting the intermediate lengths of the product to separate product loaded on one loaded member from product loaded on another adjacent loaded member.

18. A method according to claim 1, wherein the loading step is carried out by automatically winding a generally open elongate loader arm in a winder path having a perimeter associated therewith, and wherein the advancing steps are carried out so that the elongated arm travels through the perimeter of the winder path during the loading step.

19. A method according to claim 18, wherein the winder path is substantially oval.

20. A method according to claim 1, wherein the elongated product is an extruded product held in a casing.

21. A method according to claim 1, wherein the elongated product is a stuffed product held in a casing.

22. A method according to claim 1, wherein the elongated product is a meat product.

23. A method according to claim 22, wherein the elongated product is a continuous length of portioned or linked meat product.

24. A method according to claim 22, wherein the elongated product is a contiguous length of non-chain linked meat product.

25. A method according to claim 1, wherein the elongated product is a non-cased food product.

* * * * *